US012352312B2

(12) United States Patent
Baracca et al.

(10) Patent No.: US 12,352,312 B2
(45) Date of Patent: Jul. 8, 2025

(54) BEARING UNIT WITH ROLLING ELEMENTS

(71) Applicant: AKTIEBOLAGET SKF, Götenborg (SE)

(72) Inventors: Fausto Baracca, Massa (IT); Pasquale Frezza, Aversa (IT); Alessio Nebbia Colomba, Pisa (IT)

(73) Assignee: Aktiebolaget SKF (SE)

( * ) Notice: Subject to any disclaimer, the term of this patent is extended or adjusted under 35 U.S.C. 154(b) by 54 days.

(21) Appl. No.: 18/226,469

(22) Filed: Jul. 26, 2023

(65) Prior Publication Data
US 2024/0044371 A1     Feb. 8, 2024

(30) Foreign Application Priority Data

Aug. 5, 2022   (IT) .......................... 102022000016644

(51) Int. Cl.
| | |
|---|---|
| F16C 19/06 | (2006.01) |
| F16C 27/06 | (2006.01) |
| F16C 33/58 | (2006.01) |
| F16C 33/62 | (2006.01) |
| F16C 35/077 | (2006.01) |

(52) U.S. Cl.
CPC .............. *F16C 33/62* (2013.01); *F16C 19/06* (2013.01); *F16C 27/066* (2013.01); *F16C 33/583* (2013.01); *F16C 35/077* (2013.01); *F16C 2208/10* (2013.01); *F16C 2208/20* (2013.01); *F16C 2220/06* (2013.01)

(58) Field of Classification Search
CPC ...... F16C 19/06; F16C 27/066; F16C 33/583; F16C 33/62; F16C 35/077; F16C 2208/10; F16C 2208/20; F16C 2220/06
See application file for complete search history.

(56) References Cited

U.S. PATENT DOCUMENTS

| | | | | |
|---|---|---|---|---|
| 5,975,764 | A | * | 11/1999 | Okada .................... F16C 35/077 384/493 |
| 7,429,134 | B2 | * | 9/2008 | Brandenstein ........ F16C 27/066 384/537 |

(Continued)

FOREIGN PATENT DOCUMENTS

JP            2007002946 A  *  1/2007  ............ F16C 27/066

OTHER PUBLICATIONS

International Search Report for corresponding Italy Patent Application No. 102022000016644 dated Feb. 23, 2023.

*Primary Examiner* — Phillip A Johnson
(74) *Attorney, Agent, or Firm* — Stinson LLP

(57) ABSTRACT

A bearing unit comprising rolling elements, housed in a radially inner mounting seat of a casing. The bearing unit includes a radially outer and stationary coated ring provided with a metal ring and a liner of elastomeric material integral with a radially outer surface of the metal ring, a radially inner ring, which is rotatable with respect to an axis of rotation (X), and a row of rolling elements interposed between the coated ring and the radially inner ring. The elastomeric material of the liner is a vulcanized thermoplastic material. The liner is co-molded onto the radially outer surface of the metal ring and may include a cylindrical body and at least two annular protuberances which fit inside corresponding anchoring grooves formed on the surface of the metal ring.

9 Claims, 2 Drawing Sheets

(56) References Cited

U.S. PATENT DOCUMENTS

| | | |
|---|---|---|
| 7,895,748 B2 | 3/2011 | Nomura et al. |
| 10,550,893 B2 | 2/2020 | Lino et al. |
| 2017/0350452 A1 | 12/2017 | Shaikh et al. |

* cited by examiner

BEARING UNIT WITH ROLLING ELEMENTS

CROSS REFERENCE TO RELATED APPLICATIONS

This application is based on and claims priority to Italian Patent Application No. 102022000016644 filed on Aug. 5, 2022, under 35 U.S.C. § 119, the disclosure of which is incorporated herein by reference in its entirety.

FIELD

The present disclosure relates to a bearing unit with rolling elements.

BRIEF DESCRIPTION OF THE DRAWINGS

The disclosure will now be described with reference to the attached drawings which illustrate some non-limiting examples of embodiments of the disclosure, in which.

DETAILED DESCRIPTION

Figure 1:
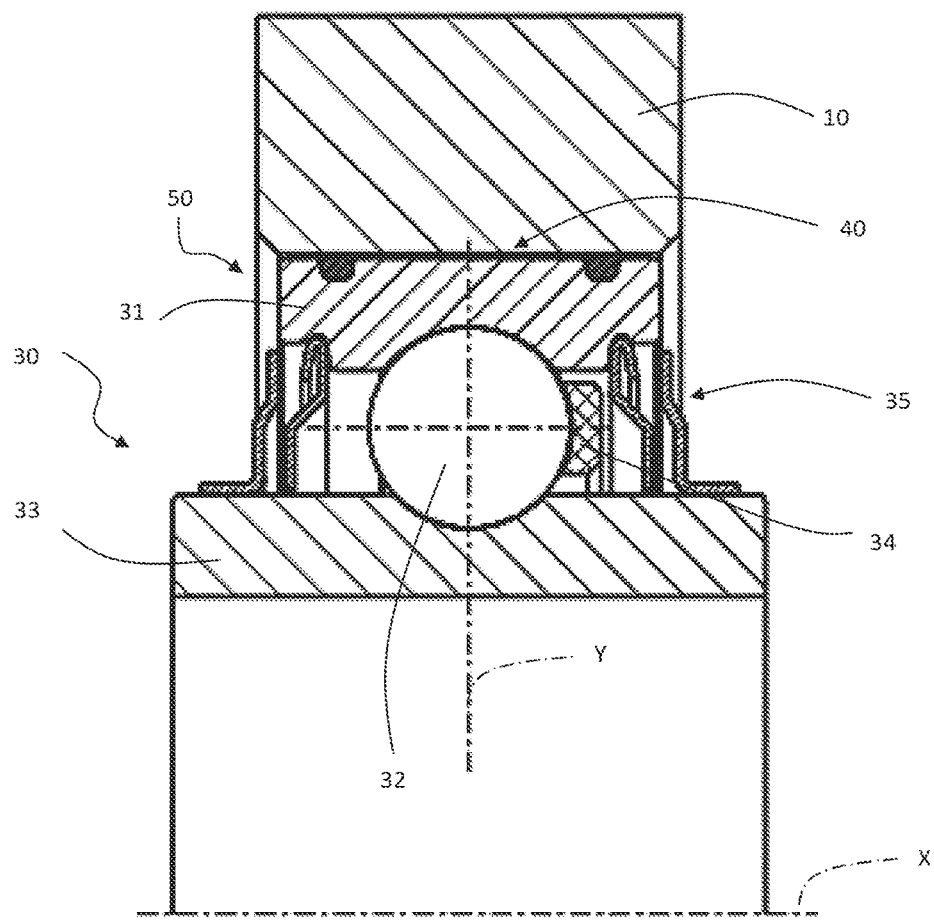
FIG. 1 illustrates a cross-section of a bearing unit with rolling elements according to exemplary embodiments of the present disclosure.

The bearing units are generally provided with a radially outer ring, which is fixed to a stationary element, for example a frame, a radially inner ring, for supporting a rotating element, for example a rotating shaft, and a plurality of rolling elements interposed between the two rings so as to allow the relative rotation thereof, The bearing units may be used in various industrial applications such as heating, ventilation and air-conditioning systems, namely in environment conditioning systems, and to situations where the bearing units are installed in the fans of the systems so as to allow the rotation of the associated rotating shafts which support the impellers of the fans.

These environment conditioning systems are used both in the civil engineering sector, for example for the air-conditioning in skyscrapers or in large airports, and in the aeronautical, motor car and railway industry, and one of the main challenges in all of these sectors is to reduce the vibration levels and the noise levels.

Excessive vibration levels result in a higher energy consumption and may give rise to premature failure, with consequent non-programmed downtimes in order to perform maintenance and a consequent drop in production volumes. The high noise levels in turn result in unhealthy working environments for the working staff.

In order, therefore, to reduce the vibrations produced by the rotating shafts and induced in the frames via the bearing units and limit as far as possible the consequent noise levels, and also limit as far as possible any damage which these vibrations may cause to the bearing units, the latter may also comprise a ring of elastomeric material which is interposed between the outer ring of the bearing unit and a seat for mounting the bearing unit in the frame and fitted onto an outer surface of the outer ring.

The bearing units of the type described above, while managing in some way to reduce the vibration and noise levels, nevertheless are subject to several problems and drawbacks as regards both mounting and reliability since the ring of elastomeric material which lines the metal outer ring of the bearing often tends to tear and be damaged during assembly of the bearing unit in the respective seat and moreover also tends, during use, to become misaligned with respect to the outer ring. In order to avoid having to manufacture a mounting seat of the bearing unit with larger dimensions, it is attempted to contain as far as possible a radial thickness of the elastomeric material ring, to the detriment, however, of both its mechanical strength and its stability in particular when the rotational speeds of the rotating shaft of the application are very high, this being typical of the systems mentioned above.

Embodiments of the present disclosure provide a bearing unit with rolling elements, which is able not only to solve the aforementioned drawbacks in a simple and low-cost manner, but also helps further improve the capacity to reduce the vibrations levels and the noise levels.

With reference to FIG. 1, a bearing unit 30 may be contained inside a radially inner mounting seat 11 of a casing 10 (only partially shown in FIG. 1) and may include: a radially outer and stationary coated ring 50; a radially inner ring 33, which is rotatable about a central axis of rotation X of bearing unit 30; and a row of rolling elements 32, in this example balls, interposed between coated ring 50 and radially inner ring 33. Bearing unit 30 may further include a cage 34 for containing the rolling elements so as to keep in position the rolling elements of the row of rolling elements 32 and a pair of sealing devices 35, arranged on opposite sides of the row of rolling elements 32, so as to seal off the bearing unit from the external environment.

In some embodiments, bearing unit 30 may be used in the ventilation systems industry.

In the present description and in the claims, the terms and the expressions indicating positions and orientations such as "radial" and "axial" are understood as being in relation to the central axis of rotation X of the bearing unit 30.

The reference number 32 may be used to refer to the individual balls and to the row of balls. Again, the term "ball" may be used by way of example in the present description and in the attached drawings instead of the more generic term "rolling element" (and likewise the same reference numbers will be used). Some examples of embodiment and the associated drawings may envisage the use of rolling elements other than balls (for example rollers) without thereby departing from the scope of the present disclosure.

Figure 2:
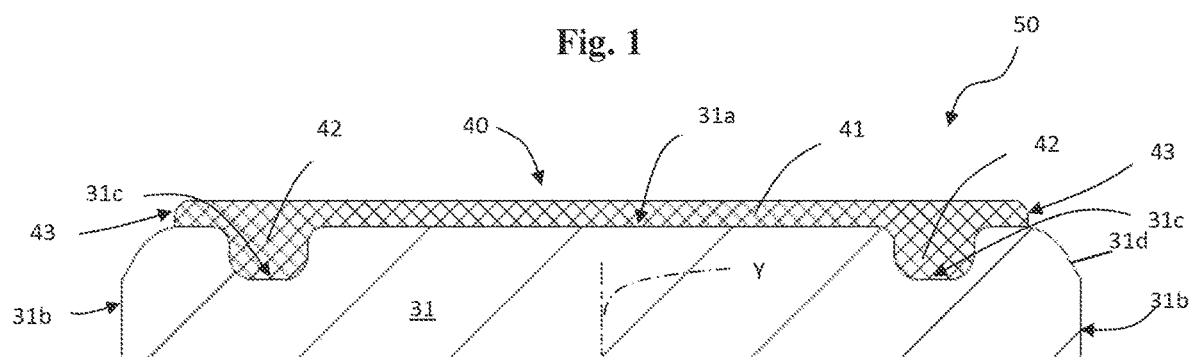
FIG. 2 illustrates an enlarged cross-sectional view of a detail of the bearing unit of FIG. 1.

According to the present disclosure and with reference also to FIG. 2, radially outer coated ring 50 of bearing unit 30 may include a metal ring 31 and a liner 40 of elastomeric material co-molded together with metal ring 31 and arranged around a radially outer surface 31a of metal ring 31. Therefore, liner 40 is radially external with respect to metal ring 31 and forms together therewith a single component, radially outer coated ring 50, which will be housed inside mounting seat 11 of casing 10.

The elastomeric material of liner 40 may be a vulcanized thermoplastic material (TPE) which has good fatigue resistance and shearing force resistance characteristics as well as a good elastic behavior when subject to compression, in view of its tendency to return to its original shape at room temperature.

Two characteristics were verified in test conditions by means of rupture tests and high-temperature dynamic fatigue tests. In rupture tests the TPE liner 40, when subjected to a horizontal force in a plane parallel to the support surface on the radially outer ring (the surface being that on which "rubber on metal" contact occurs), did not show signs of fractures or tearing. During high-temperature dynamic fatigue tests, TPE liner 40, when subjected to loads in various directions and of varying intensity (for example, thrusts on the end portions), as a result of the elastic effect, dampened the vibrations on the central portion and, consequently, the effect of the deformations on the central portion was limited.

Therefore, in some embodiments of the disclosure, in which liner 40 is co-molded onto radially outer ring 50 and is made of TPE, the thickness of the elastomeric liner may be reduced to a minimum. Since it is co-molded and therefore firmly fastened to metal ring 31 and is also made of breakage-resistant material with a good elastic behavior, liner 40 may have a very small radial thickness without the risk of compromising its intact condition during mounting. Furthermore, the use of a smaller thickness for liner 40 does not affect the choice of the mounting seat 11 in casing 10, with the need for larger diameters or the need for a casing with a size greater than that stipulated in the international standards (ISO, JIS, etc.).

Liner 40 has an axial dimension which may remain within the axial dimensions of the metal ring 31 so as not to alter the maximum axial volume of the bearing unit 30 and allow the annular end surfaces 31b of the metal ring 31 to be used, where necessary, as contact and/or locating surfaces for other components in which the bearing unit 30 is mounted.

Liner 40 may include a cylindrical body 41 and two annular protuberances 42 which are radially internal with respect to cylindrical body 41 and located on opposite sides with respect to a radial axis Y of symmetry of bearing unit 30. These annular protuberances 42, during co-molding, may be formed inside corresponding anchoring grooves 31c which are formed on surface 31a of radially outer ring 31 and may also be symmetrical with respect to the radial axis Y, owing to the optimum capacity of the vulcanized thermoplastic material to fill the anchoring grooves.

The set of annular protuberances 42 of liner 40 and corresponding anchoring grooves 31c of radially outer ring 31, during the co-molding process, causes the fastening together of radially outer ring 31 and liner 40 and fixes together these two components so as to form radially outer coated ring 50.

In some embodiments, the number of annular protuberances 42 and corresponding anchoring grooves 31c may be at least two so as to be able to ensure firm fastening together of the two co-molded components. In some embodiments, the number of annular protuberances 42 and corresponding anchoring grooves 31c may be greater than two.

Figure 3:
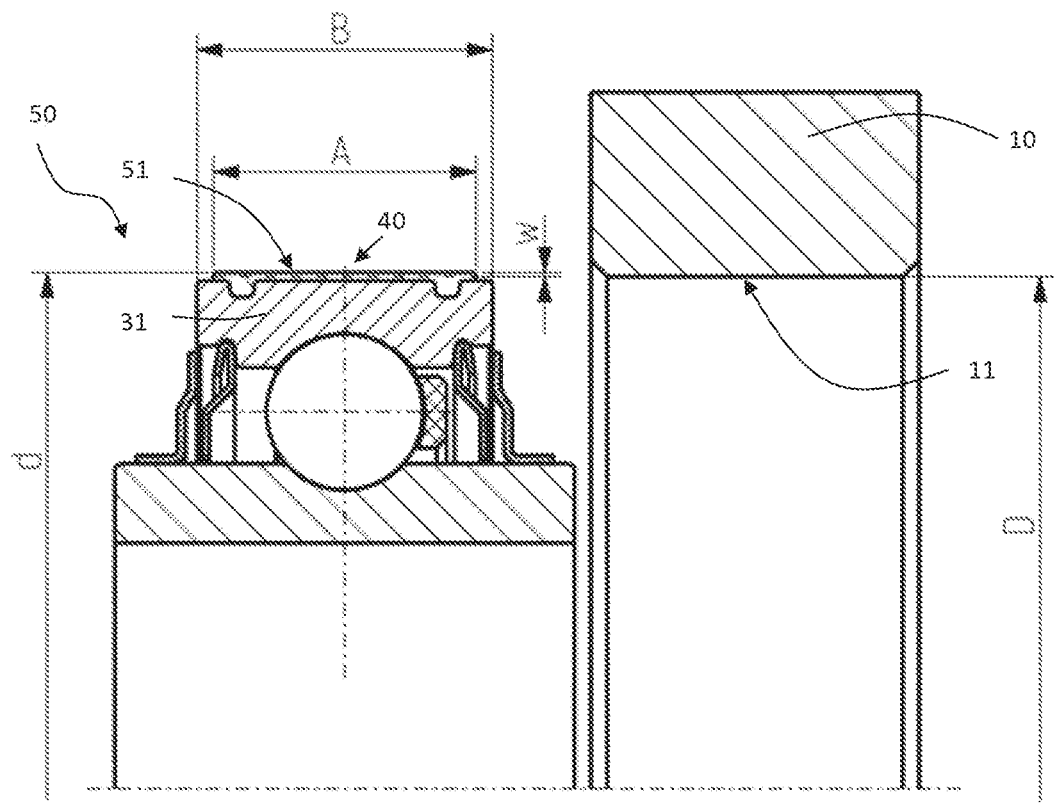
FIG. 3 illustrates a cross-sectional view of the bearing unit of FIG. 1 and, alongside a casing in which the bearing unit is housed.
Figure 4:
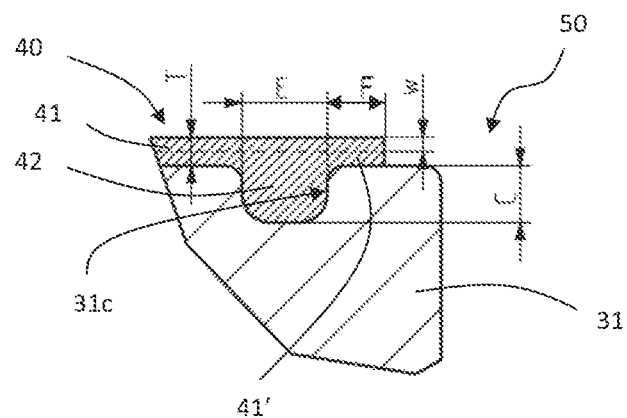
FIG. 4 illustrates an enlarged cross-sectional view of a further detail of the bearing unit of FIG. 1.

In some embodiments, with reference to FIGS. 3 and 4, an axial dimension A of liner 40, namely the distance between its two annular end surfaces 43, is less than the axial dimension B of radially outer ring 31. In some embodiments, the distance between the two annular end surfaces 31b of radially outer ring 50 is:

$A = B - 2$ mm.

Accordingly, the maximum axial volume of bearing unit 30 is not altered, and the two annular end surfaces 31b of metal ring 31 may be used as contact and/or locating surfaces for other components in which bearing unit 30 is mounted. In view of the difference of two millimeters between the axial distances B and A, the result is that liner 40 substantially covers the entire cylindrical surface 31a of metal ring 31, without however protruding beyond it, in the zone where the connecting surfaces 31d (i.e. those which connect the cylindrical surface 31a to the annular end surfaces 31b) are present, so as to avoid the formation of a zone of non-optimal adhesion of the elastomer on the metal.

In some embodiments, the thickness T of liner 40 is the thickness of its cylindrical body 41 in the undeformed state, i.e. the state where it is not yet assembled in the containing casing 10. Values of this thickness which are too high would penalize the radial volume of bearing unit 30 (and consequently of its containing casing 10). On the other hand, values of the thickness T, which are too low, would not help attenuate in an optimum manner the noise and vibration levels. By using TPE material for liner 40, it is possible to define, following simulations, as well as the aforementioned experimental tests, an optimum range of values of the thickness T of cylindrical body 41 ranging between 0.45 mm and 0.55 mm.

In some embodiments, the fastening together of metal ring 31 and liner 40 ensures the stability of radially outer coated ring 50. The number and the size of the anchoring grooves 31c may therefore be correlated to the thickness T of cylindrical body 41 of liner 40: the greater the thickness T, the greater the number and/or the width—both axial E and radial C—of anchoring grooves 31c in order to contain more elastomeric material (the annular protuberances 42) to ensure optimum fastening. The optimal relationship between these parameters is as follows:

Number $n$ of anchoring grooves 31c: $n=2$

Axial width $E$ of the anchoring grooves 31c: $E=2\times T$

Radial width $C$ of the anchoring groove 31c: $C=2\times T$

Therefore, in some embodiments, both the dimensions (radial width C and axial width E) are correlated to the thickness of cylindrical body 41 of liner 40 in a directly proportional manner: by so doing, with an increase in the thickness of the cylindrical body, there is a proportional increase in the depth (radial width C) and the width (axial width E) of the anchoring groove so as to keep cylindrical body 41 of liner 40 firmly fastened to the metal ring 31. The proportionality factor of 2 was estimated on the basis of test results.

In some embodiments, for correct insertion of radially outer coated ring 50 inside casing 10, there may not be any separation of end portions 41' of cylindrical body 41, i.e. those portions which extend axially on the outside of the protuberances 42. For this purpose, the axial dimension F of end portion 41' may not exceed half the axial width E of the anchoring groove 31c, i.e.: F<E/2.

Mounting of bearing unit 30, namely of radially outer coated ring 50, in mounting seat 11 of casing 10 may be performed by an interference fit between radially outer coated ring and mounting seat 11. During mounting, the elastomeric material may be subject to compression crushing. In some embodiments, depending on the prechosen elastomeric material, the compression crushing w of the elastomer is defined so that, on the one hand it is not excessive, negatively affecting the functioning of the said liner, and on the other hand so that it is not too small so as to ensure correct interference between bearing unit 30 and casing 10. If the compression crushing w is defined as the reduction in thickness which cylindrical body 41 undergoes as a result of mounting in casing 10 calculated with respect to its initial undeformed thickness T, simulation analyses of the finished elements and subsequent experimental confirmation tests have shown that this crushing w is correlated to the other geometric parameters of liner 40 and cylindrical surface 31a of metal ring 31 by the following relation:

$$w=[(B-A)\times T]/B$$

where: A is the axial dimension of liner 40, B is the axial dimension of metal ring 31, and T is the thickness in the undeformed state of cylindrical body 41, as defined above.

This relation arises from the consideration, based also on the experience of the Applicant, that an elastomeric material is more or less incompressible, namely when "crushed" it tends to maintain the same volume. Therefore, the elastomeric portion which is compressed may be able to "fill" the "free" space—axially outwards on opposite sides of the axis Y—which is created between casing 10 and metal ring 31 once they are assembled.

As a result, it is possible to avoid, should the elastomeric liner not have sufficient free space to expand axially: the introduction of additional stresses acting on the radially outer ring to point of causing, in the worst cases, deformation of the raceway and a reduction in the working life of the bearing unit; and the risk of seepage of elements which make up the elastomer, in particular, liquid components of the mixture.

In some embodiments, the compression crushing w of the elastomeric material may be used to define the mounting relationship between radially outer coated ring 50 and casing In particular, the outer diameter d of the coated ring 50, namely the diameter d of its radially outer cylindrical surface 51 may be related to the inner diameter D of casing 10, i.e. the diameter D of its radially inner mounting seat 11, as follows:

$$d=D+2w$$

where w is the compression crushing of liner 40.

In some embodiments, the presence of the elastomeric material liner of the radially outer ring reduces the noise and vibrations levels in particular at high speeds of the ventilation systems (or other machinery). In some embodiments, the alignment of the bearing units is improved with the frame of the ventilation system. In this way, it is possible to reduce the forces which act on the single bearing units and the consequent noise and vibrations levels. In some embodiments, the design of the elastomer liner co-molded onto the radially outer ring allows a reduction in the radial volume of the bearing unit. In some embodiments, it is possible to provide a single component—the radially outer coated ring—instead of two separate components.

There are numerous other variants in addition to the embodiment of the disclosure described above. Furthermore, said embodiments are merely examples that limit neither the scope nor the disclosure nor the possible arrangements of the disclosure. Indeed, although the above description enables the person skilled in the art to carry out the present disclosure according to at least one example embodiment thereof, many variants of the described components can also be used without thereby departing from the scope of the disclosure as defined in the attached claims, which should be understood literally and/or according to the legal equivalents thereof.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this disclosure, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A bearing unit system comprising:
   a casing comprising a radially inner mounting seat;
   a bearing unit housed in the radially inner mounting seat, the bearing unit comprising:
   a radially outer coated ring comprising a metal ring and a liner of elastomeric material integral with a radially outer surface of the metal ring, the liner having an axial width (A) smaller than an axial width (B) of the metal ring;
   a radially inner ring; and
   a row of rolling elements interposed between the radially outer coated ring and the radially inner ring;
   wherein the elastomeric material of the liner is a vulcanized thermoplastic material, and the liner is co-molded onto the radially outer surface of the metal ring.

2. The bearing unit system of claim 1, wherein the liner comprises a cylindrical body and at least two annular protuberances configured to fit inside corresponding anchoring grooves formed on the surface of the metal ring.

3. The bearing unit system of claim 2, wherein the annular protuberances are radially internal with respect to the cylindrical body of the liner and located on opposite sides with respect to a radial axis of symmetry of the bearing unit.

4. The bearing unit system of claim 3, wherein a thickness (T) of the cylindrical body of the liner ranges between 0.45 mm and 0.55 mm.

5. The bearing unit system of claim 4, wherein a radial width of the two anchoring grooves is equal to twice the thickness (T) of the cylindrical body.

6. The bearing unit system of claim 4, wherein an axial width of the two anchoring grooves is equal to twice the thickness (T) of the cylindrical body.

7. The bearing unit system of claim 6, wherein an axial width of an end portion of the cylindrical body does not exceed half the axial width of the anchoring groove.

8. The bearing unit system of claim 6, wherein a compression crushing (w) of the cylindrical body, in a mounting operating configuration inside the casing, is equal to:

$$W=[(B-A)\times T]/B.$$

9. The bearing unit system of claim 8, wherein an outer diameter of the radially outer coated ring is equal to an inner diameter of the mounting seat of the casing increased by double the compression crushing (w) of the cylindrical body.

* * * * *